July 28, 1953 — A. J. LIPPOLD — 2,646,819
FLOAT-CONTROLLED VALVE
Filed Oct. 21, 1947 — 3 Sheets-Sheet 1
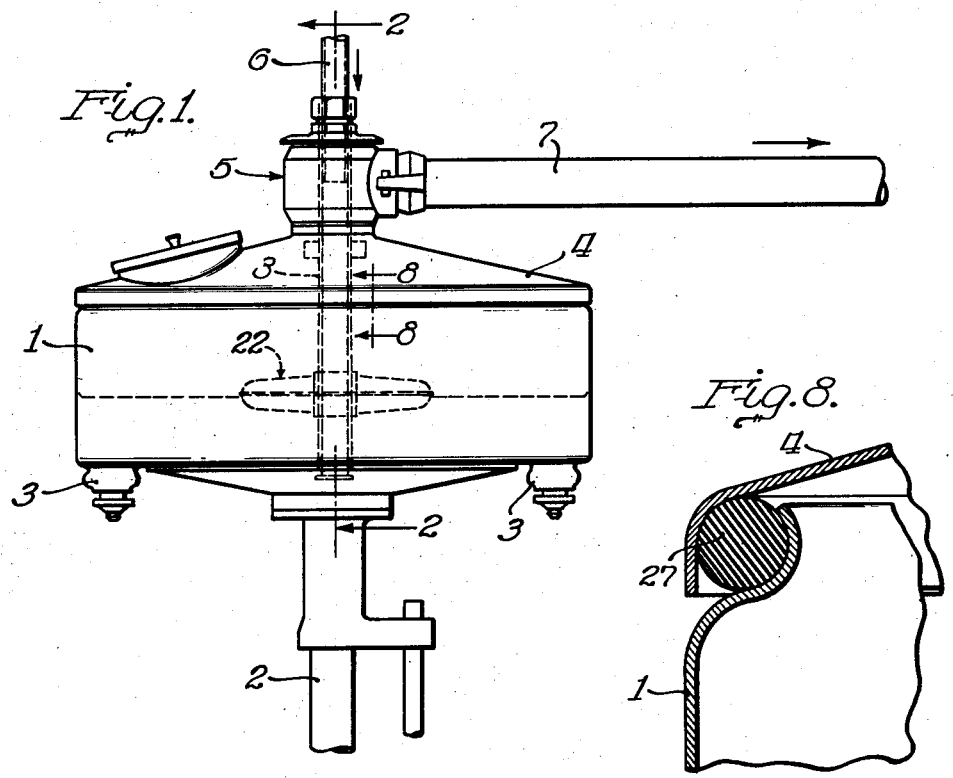
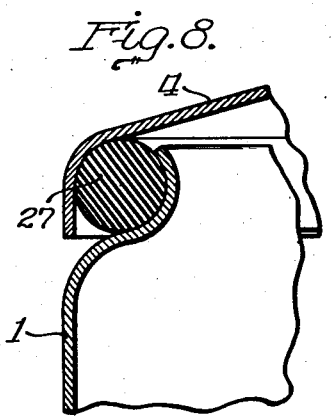
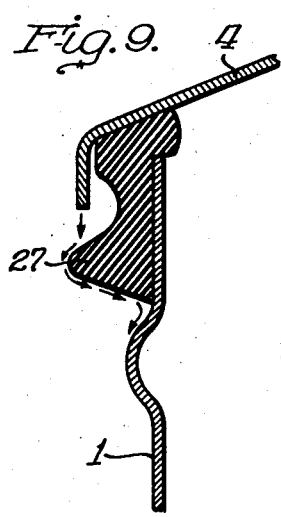
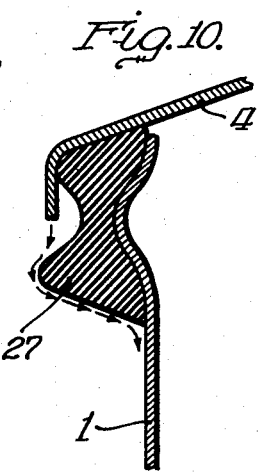
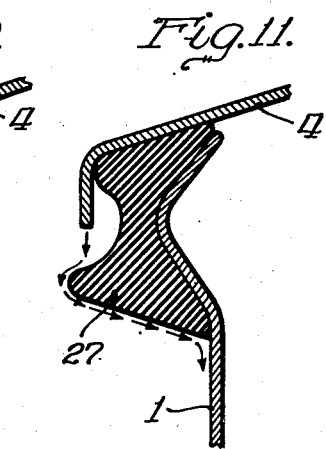
INVENTOR.
Adolph J. Lippold
BY
Norman E. H. Peletzke
Atty.

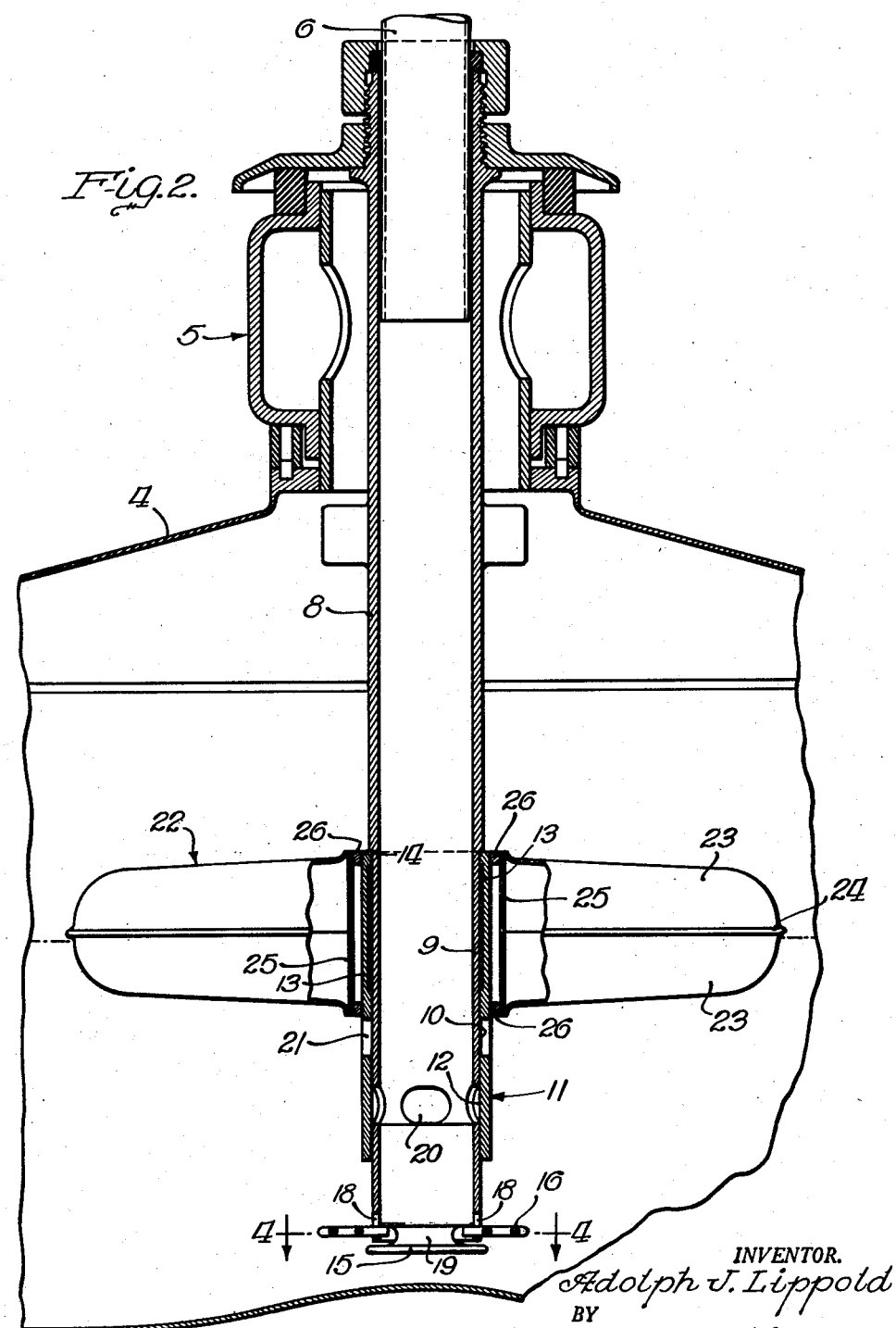

July 28, 1953  A. J. LIPPOLD  2,646,819
FLOAT-CONTROLLED VALVE
Filed Oct. 21, 1947  3 Sheets-Sheet 3
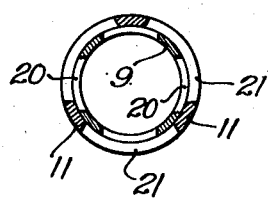
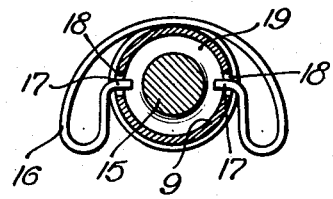
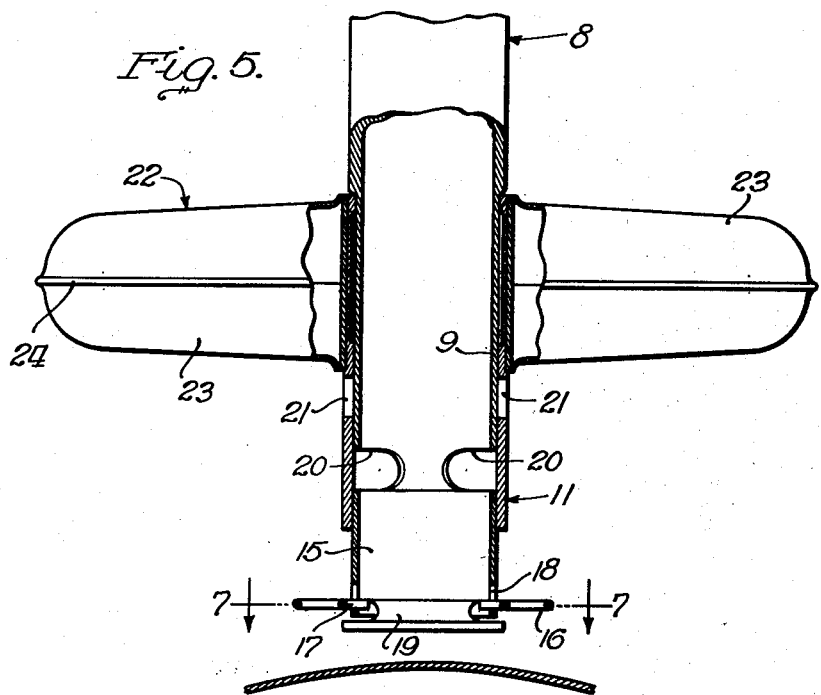
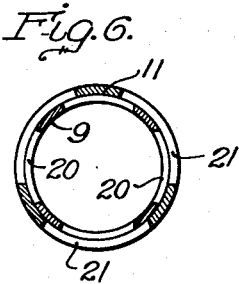
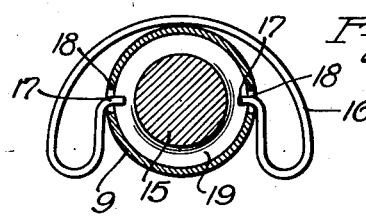
INVENTOR.
Adolph J. Lippold
BY
Norman E. H. Helitzke
Atty.

Patented July 28, 1953

2,646,819

UNITED STATES PATENT OFFICE 2,646,819

FLOAT-CONTROLLED VALVE

Adolph J. Lippold, Milwaukee, Wis., assignor to Cherry-Burrell Corporation, Chicago, Ill., a corporation Application October 21, 1947, Serial No. 781,194

3 Claims. (Cl. 137—432)

This invention pertains to improvements in valves. More particularly, the invention pertains to improvements in float type valves, designed practiularly for use in handling of food products.

The objects of this invention include the provision of an improved type of float valve, embodying various sanitary design features and consisting preferably of a welded construction.

In many conventional types of float valves, particularly float valves designed for use in food processing machines, the parts thereof are fabricated by the use of relatively expensive manufacturing operations. Float control valves which are sanitary in every respect, which may be easily assembled and disassembled, and in which the disassembled parts may be readily inspected and cleaned, are commonly expensive to fabricate.

The primary object of this invention is to provide a highly efficient, relatively simple, easily cleaned float control valve, in which the parts thereof may be easily assembled and disassembled, and in which certain portions of the float valve have been so designed as to lend themselves to quantity production methods.

The foregoing and other objects and advantages of this invention will become more apparent and will be more readily understood when considered in connection with the drawings of the preferred embodiments of the present invention, which, without desire of limitation, will be described and illustrated as an improved type of float valve adapted for use in connection with a bottle filling machine.

In the accompanying drawings:

Figure 1 is an elevational view of an automatic bottle filler supply bowl or tank, equipped with the improved type of float control valve.

Figure 2 is a vertical, sectional view, taken along line 2—2 of Figure 1 of the drawings.

Figure 3 is a horizontal, sectional view, taken through the open liquid discharge ports of the improved float valve of the type illustrated in Figure 2 of the drawings.

Figure 4 is a sectional view, taken along line 4—4 of Figure 2 of the drawings.

Figure 5 illustrates a modified form of float valve.

Figure 6 is a sectional view taken through the open discharge ports of the modified valve shown in Figure 5 of the drawings.

Figure 7 is a sectional view, taken along line 7—7 of Figure 5 of the drawings.

Figure 8 is a view taken along line 8—8 of Figure 1 of the drawings.

Figures 9, 10 and 11 illustrate three modifications of the bottle filler bowl gasket and the adjacent portions of the upper edge of the filler bowl and the lower edge of the filler bowl cover, any one of which may be substituted for the corresponding arrangement shown in Figure 8 of the drawings.

Referring to the drawings, in which like numerals are used to identify like elements, I represents the filler bowl which is supported for rotary motion on the spindle 2, and which is provided with an annular series of receptacle filling heads 3 and a closure or cover 4. The centrally apertured closure cover 4 is provided with a swivel coupling 5 in the central aperture. Liquid may be introduced into the reservoir I by means of the coupling 5 and supply conduit 6, and gas may be withdrawn from the closed reservoir I by means of the coupling 5 and pipe 7.

The supply conduit 6 extends into the swivel coupling 5 and therein joins the supply pipe 8. Supply pipe 8 extends downwardly through the central portion of the reservoir I and terminates near the bottom thereof. The lower portion of the pipe 8 in the applicant's preferred embodiment of the invention constitutes a valve body 9. The outer surface of the valve body 9 has been accurately machined to provide a substantially cylindrical bearing surface 10, over which is telescoped a valve sleeve 11. Sleeve 11 is provided with an accurately machined, substantially cylindrical inner bearing face 12, which is in sliding contact with the complementary bearing surface 10 on the valve body 9. The inner surface 12 of the valve sleeve 11 near the upper portion thereof is provided with a relatively wide groove 13. Groove 13 provides a relatively wide space longitudinally of the valve sleeve intermediate the inner and outer valve bodies. This space intermediate the inner and outer valve bodies is relatively narrow transversely of the telescoped valve elements.

The sleeve bearing on the outer surface of the inner valve body element 9 is defined at its upper extremity by an offset shoulder 14 at the juncture of the inner valve element 9 with the pipe 8 or at the position where the lower end of the pipe 8 has been transformed into the upper end of an inner valve body element 9. The lower end of the inner valve body element 9 is sealed by a cylindrical valve plug 15. The outer cylindrical surface of plug 15 has been accurately machined, and plug 15 is telescoped snugly into the lower end of the valve body 9, thereby sealing the same. The valve plug 15 is releasably secured in sealing position in the valve body 9 by means of spring clip 16. A portion of clip 16 fits closely against the outer surface of the inner valve body 9, immediately adjacent the lower end thereof. The ends 17 of clip 16 extend through opposed openings 18 in the lower end of the inner valve element 9 into a groove 19 in the lower outer surface of the plug 15. When the spring clip 16 has been assembled onto the end of the inner valve body 9, it, together with the shoulder 14, defines the maximum lower and upper limits, respectively, of the possible vertical motion of the valve sleeve 11 upon the valve body 9.

As is common practice in the construction of sleeve valves, the inner valve body 9 immediately above the upper end of the plug 15 is provided with a number of apertures 20 in the side wall thereof. The apertures 20 are adapted to register with the apertures 21 in the outer valve sleeve element 11 when the valve sleeve 11 is in such a position as to bring the apertures 21 to substantially the same elevation as the apertures 20. The number of apertures 20 and 21 and the circumferential dimensions thereof are such that when the apertures 20 and 21 are at substantially the same elevation the rotation of the valve sleeve element 11, with respect to the valve body 9, will, at no position during such rotation, seal the apertures 20. The apertures 20 in the valve body 9 may be sealed only by valve sleeve 11 upon the movement of the apertures 21 in the valve sleeve 11 to a position above that occupied by the apertures 20.

The float 22 for the actuation of the valve sleeve 11 consists of a hollow annular element formed of two corresponding annular dish-shaped sections 23, one of which has been inverted upon the other, and which have been welded together along their outer line of juncture 24. To seal the float 22, there is provided a substantially cylindrical inner wall 25, which defines the central aperture through the annular float 22, and which is joined as by welding along its upper and lower edges to the adjacent edges which define the central openings through the float section 23.

It is common practice in the fabrication of float valves according to the present invention to form the float element 22 of relatively light weight sheet metal. The float element 22 and the elements 9 and 10 may also be formed of such non-corrodible metals as stainless steel, etc. The sections 23 of the float 22 and the cylindrical inner wall 25 are preferably joined together by welding. It is common knowledge that upon the welding of formed elements made of light gauge or thin sheets of metal that appreciable distortion may result. It is also common knowledge that in joining an element, such as float 22, to the valve sleeve 11 by such a method as welding, that an undesirable amount of distortion may be produced in the accurately machined valve sleeve 11. It is desirable to weld the float 22 to the valve sleeve 11 subsequent to the machining of the valve sleeve 11. In the commercial manufacture of float valves, it would be highly impractical to use only such floats 22 which could be accurately welded without any appreciable degree of distortion resulting from the extensive welding operations.

One of the chief objections to the distortion which follows the welding of the float 22 to a more conventional type of sleeve 11 is that the inner, accurately machined surface of the sleeve 11 becomes so distorted as to cause the inner face of the sleeve 11 to bind on the outer face of the valve body 9. Additional machining of the sleeve 11 has been found to be impractical, in view of the fact that as machining progresses on the distorted, highly strained metal, further distortions may develop as a result of the cutting away of additional metal.

To overcome these difficulties of joining the float valve 22 to the sleeve 11, the applicant has found that by providing a wide but shallow groove on the inner face of the sleeve 11 immediately opposite that portion thereof to which the float 22 is welded, the objectionable distortion of the sleeve 11 is prevented. This construction permits the accurate machining of the sleeve 11 prior to the welding operations, without requiring elaborate subsequent machining of the closely interfitting parts 9 and 11. The removal of a portion of the metal from the inner face of the sleeve 11, immediately opposite that part of the sleeve 11 to which the float 22 is to be welded, provides a space for localizing welding distortions which result from the welding of the float 22 to the sleeve 11, and provides sufficient clearance so that the resulting distortion of the upper portion of the sleeve 11 will not be sufficient to cause the sleeve 11 to bind on the valve body 9.

The type of construction just described is clearly illustrated in Figure 5 of the drawings, and is adaptable for use in the fabrication of valves in which the float is of a relatively small size. In those instances in which the float is of a relatively large size, it may be desirable to use the supplemental construction, particularly well illustrated in Figure 2 of the drawings, in which the narrow and shallow annular adapter rings 26 are provided intermediate the upper and lower ends of the cylindrical inner wall 25 of the float 22 and the adjacent surface of the outer wall of the valve sleeve 11. When the adapter rings 26 are used, it is, of course, necessary to weld the upper and lower edges of the cylindrical wall 25 to the associated adapter rings 26, and also to weld the adapter rings 26 to the adjacent surfaces of the valve sleeve 11.

By the use of the last described arrangement, it is obvious that an appreciable space, i. e., a space equal in depth to the width of the adapter ring element 26, will be provided intermediate the cylindrical inner wall 25 of the float 22 and the outer surface of the sleeve 11. This space, supplementing the space 13 intermediate the valve sleeve 11 and the valve body 9, immediately opposite that portion of sleeve 11 to which the float 22 is welded, prevents to some extent the transmission of the distortion strains which are present in a welded annulus, such as the float 22, from the float 22 to the valve sleeve 11, and also prevents the direct contact between the inner wall 25 and the valve sleeve 11.

As illustrated in Figure 1 of the drawings, the improved type of float valve is particularly well adapted to be used in connection with a vacuum type of automatic rotary bottle filler. In such bottle filler, the upper edge of the tank 1 is usually sealed to the lower edge of the cover 4, by the use of a compressible gasket, such as a rubber gasket 27, which is secured in between overlapping flanges of the associated edges of the supply tank 1 and cover 4, as clearly illustrated in Figure 8 of the drawings.

It is common knowledge in the use of bottle fillers in bottling plants, such as milk bottling plants, that condensate tends to gather on the surfaces of the supply tank 1. In many instances, the covers and outer edges of the supply tank 1 are of such a design that as the empty bottles are moved into filling position below the reservoir 1 and the full bottles are moved away from filling position below the reservoir 1, contaminated condensate may drip into the bottles.

In Figures 9, 10 and 11, there has been illustrated an improved arrangement in a tank cover and tank edge and associated gasket for sealing the cover to the upper edge of the tank whereby the condensate which may accumulate on the cover of the tank is drained therefrom onto a portion of the gasket from which, in turn, it drains onto the outer surface of the tank 1, thereby preventing the dripping of the condensate from the cover 4 into the empty or filled bottles as they are moving through below the edge of the cover 4 during the bottle filling operations.

Having thus described and illustrated the preferred embodiment of the present invention, the invention is not to be restricted to the specific embodiment thereof, as illustrated in the drawings and as hereinbefore described, excepting insofar as may be necessary in view of the disclosure of the prior art and appended claims.

The invention is hereby claimed as follows:

1. In a valve the combination comprising a supply pipe having at one end a valve body, a closure for the free end of said valve body, a lateral port in the wall of said body, a substantially cylindrical bearing surface on the outer face of said valve body, a substantially cylindrical valve sleeve having an inner bearing surface complementary to the bearing surface on said valve body and in sliding contact therewith, a lateral port in the wall of said valve sleeve to afford communication with the interior of said valve body when at least a portion of the ports in said valve body and said valve sleeve are in alignment, means for limiting the axial sliding motion of said valve sleeve in a direction away from the closed end of said valve body, a groove in the inner bearing surface of said valve sleeve remote from the ported portions thereof, float means carried by said valve sleeve for unitary movement therewith and having a substantially cylindrical inner wall defining an opening through said float means, said float means having been secured to said valve sleeve in a manner tending to distort said valve sleeve, and releasable means for securing said valve sleeve and associated float against removal from said valve body, the closure for said valve body comprising a plug having a cylindrical outer surface and being telescoped into a cylindrical opening in the end of said valve body with the cylindrical wall of said plug in sealing engagement with the complementary inner wall of said cylindrical opening in said valve body, a groove in the outer cylindrical surface of said plug, an opening in the wall of said valve body opposite said groove in said plug, and spring clip means secured to said valve body having a portion thereof extending into said groove through said opening in the wall of said valve body to lock said plug in the end of said valve body.

2. In a valve the combination comprising a supply pipe having at one end a valve body, a closure for the free end of said valve body, a lateral port in the wall of said body, a substantially cylindrical bearing surface on the outer face of said valve body, a substantially cylindrical valve sleeve having an inner bearing surface complementary to the bearing surface on said valve body and in sliding contact therewith, a lateral port in the wall of said valve sleeve to afford communication with the interior of said valve body when at least a portion of the ports in said valve body and said valve sleeve are in alignment, means for limiting the axial sliding motion of said valve sleeve in a direction away from the closed end of said valve body, a groove in the inner bearing surface of said valve sleeve remote from the ported portions thereof, float means carried by said valve sleeve for unitary movement therewith and having a substantially cylindrical inner wall defining an opening through said float means, said float means having been secured to said valve sleeve in a manner tending to distort said valve sleeve, and releasable means for securing said valve sleeve and associated float against removal from said valve body, said float means including a substantially cylindrical inner wall substantially equal in length to the width of said groove and operatively supported on said valve sleeve opposite said groove, relatively narrow adapter rings being positioned intermediate the ends of said substantially cylindrical inner wall and the outer surface of said valve sleeve above and below that portion of said valve sleeve wherein said groove is located and joined to the adjacent surfaces of said valve sleeve and cylindrical inner wall.

3. In a valve the combination comprising a supply pipe having at one end a valve body, a closure for the free end of said valve body, a lateral port in the wall of said body, a substantially cylindrical bearing surface on the outer face of said valve body, a substantially cylindrical valve sleeve having an inner bearing surface complementary to the bearing surface on said valve body and in sliding contact therewith, a lateral port in the wall of said valve sleeve to afford communication with the interior of said valve body when at least a portion of the ports in said valve body and said valve sleeve are in alignment, means for limiting the axial sliding motion of said valve sleeve in a direction away from the closed end of said valve body, a groove in the inner bearing surface of said valve sleeve remote from the ported portions thereof, float means carried by said valve sleeve for unitary movement therewith and having a substantially cylindrical inner wall definng an opening through said float means, said float means having been secured to said valve sleeve in a manner tending to distort said valve sleeve, and releasable means for securing said valve sleeve and associated float against removal from said valve body, said float means including a substantially cylindrical inner wall substantially equal in length to the width of said groove and operatively supported on said valve sleeve opposite said groove, relatively narrow adapter rings being positioned intermediate the ends of said substantially cylindrical inner wall and the outer surface of said valve sleeve above and below that portion of said valve sleeve wherein said groove is located and joined to the adjacent surfaces of said valve sleeve and cylindrical inner wall, said adapter rings being permanently joined to said substantially cylindrical inner wall and said valve sleeve by any suitable weld.

ADOLPH J. LIPPOLD.

References Cited in the file of this patent

UNITED STATES PATENTS

| Number | Name | Date |
| --- | --- | --- |
| 393,621 | Cook et al. | Nov. 27, 1888 |
| 832,780 | Cutter | Oct. 9, 1906 |
| 857,703 | Willmann | June 25, 1907 |
| 921,865 | Miller | May 18, 1909 |
| 1,187,773 | Oldham | June 20, 1916 |
| 1,522,982 | Strandt | Jan. 13, 1925 |
| 1,535,721 | Gill | Apr. 28, 1925 |
| 1,734,586 | Larsen | Nov. 5, 1929 |
| 2,189,427 | Long | Feb. 6, 1940 |
| 2,210,331 | Bindernagel | Aug. 6, 1940 |